United States Patent
Oetting

[15] 3,656,852
[45] Apr. 18, 1972

[54] APPARATUS FOR BRINGING TWO FILMS INTO INTIMATE CONTACT WITH EACH OTHER

[72] Inventor: Robert F. Oetting, North Hollywood, Calif.

[73] Assignee: Cutler-Hammer, Inc., Milwaukee, Wis.

[22] Filed: June 15, 1970

[21] Appl. No.: 46,303

[52] U.S. Cl. ............................................................355/91
[51] Int. Cl. .......................................................G03b 27/20
[58] Field of Search .................................355/91, 92, 93, 94

[56] References Cited

UNITED STATES PATENTS

| | | | |
|---|---|---|---|
| 2,408,310 | 9/1946 | Hassler | 355/103 |
| 1,151,477 | 8/1915 | Knudsen | 355/93 |
| 1,234,416 | 7/1917 | Sweigard | 355/91 |
| 3,468,606 | 9/1969 | Wolf et al. | 355/91 |

FOREIGN PATENTS OR APPLICATIONS 6,703,960   9/1967   Netherlands............................355/91

Primary Examiner—Samuel S. Matthews
Assistant Examiner—Fred L. Braun
Attorney—Christie, Parker & Hale

[57] ABSTRACT

Two lengths of film are gradually forced into intimate contact from their centers outwardly to their edges and then held in intimate, non-slipping contact from edge to edge while the information stored on one of the films is transferred to the other film. The films are transported between two adjacent, spaced platens adapted to form cushions of air that force the films together. One of the platens is shaped to converge in the region where the films initially pass between the platens. Preferably, the converging platen has an apex that is aligned with the centers of the films. In one embodiment, the platen is a trough having converging sides at one end. In another embodiment, the platen is a microporous material through which air is forced.

5 Claims, 4 Drawing Figures

PATENTED APR 18 1972 3,656,852
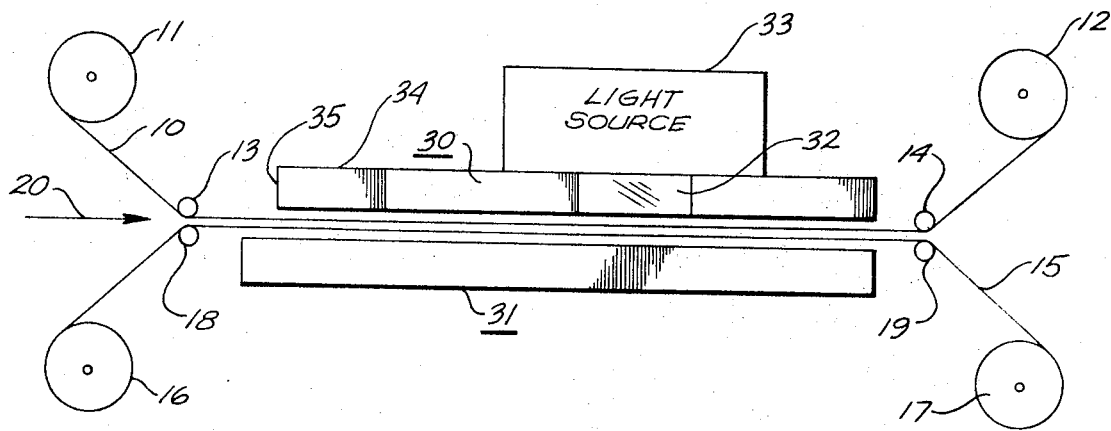
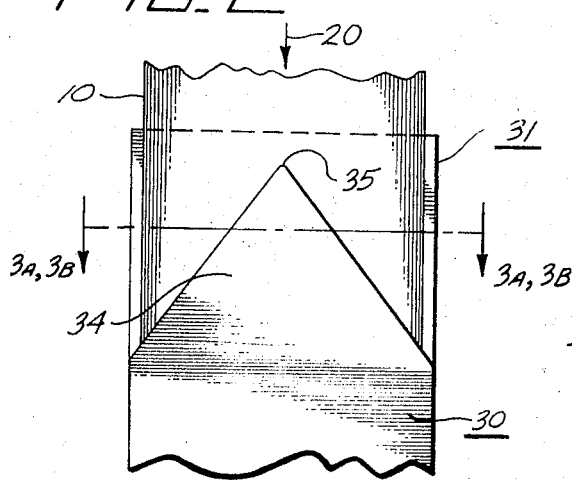
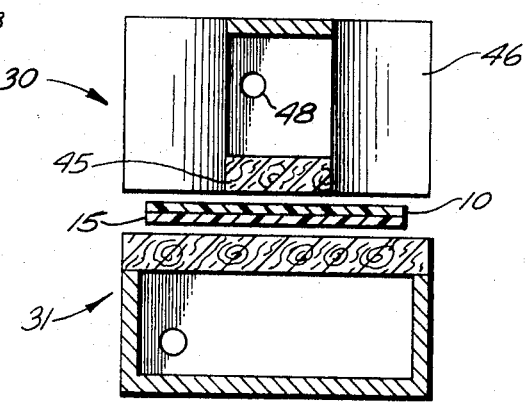
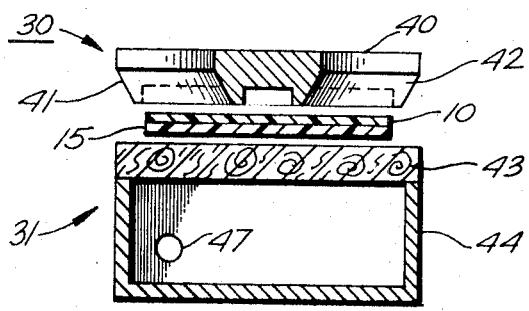
INVENTOR.
ROBERT F. OETTING
BY
Christie, Parker & Hale
ATTORNEYS 3,656,852

APPARATUS FOR BRINGING TWO FILMS INTO INTIMATE CONTACT WITH EACH OTHER

BACKGROUND OF THE INVENTION

This invention relates to the film handling art and, more particularly, to an apparatus and method for bringing two films into intimate contact with each other.

The need sometimes arises to bring two ribbon-type media into intimate contact with each other for the purpose of transferring information from one medium to the other. For example, a contact printer transfers a photographic image from a master film to a raw film by exposing the films to light while they are in contact. Contact printing is particularly advantageous for microfilm reproduction on a mass scale because the image can be transferred during continuous film transport without a size reduction or the distortion that might be introduced by a lens system.

Film wear can be minimized by bringing two films into contact with air pressure. N. R. Timares et al. U.S. Pat. No. 3,161,120, which issued Dec. 15, 1964, discloses apparatus comprising two adjacent spaced air platens between which two films pass. The platens have identical patterns of pin holes through which air is forced to form air cushions that force the films together. A copending patent application of Poul B. Roulund and Minard A. Leavitt entitled FILM HANDLING APPARATUS, Ser. No. 27,690, filed on Apr. 13, 1970, now abandoned, discloses trough-shaped air platens that exhibit a substantially rectangular pressure profile, the pressure dropping sharply at the film edges. Another copending patent application of Minard A. Leavitt and Poul B. Roulund, Ser. No. 46,430, entitled APPARATUS FOR HOLDING TWO FILMS IN INTIMATE CONTACT WITH EACH OTHER, filed on even date herewith, and assigned to the assignee of the present application, discloses platens made of microporous material through which air is forced to form cushions of air between the platens and films.

Air tends to become trapped between the films as they are being brought together between the air platens described above. Once the films are in intimate contact with each other, it is difficult to dissipate pockets of air formed between them. Consequently, the films may slip relative to each other, or a distorted image may be reproduced on the raw film.

SUMMARY OF THE INVENTION

According to the invention, two films are gradually forced into intimate contact with each other in a continuous sweep across their surfaces, preferably from their centers outwardly to their edges. As a result, the air is driven systematically from between the films, as they are forced into contact.

The two films are directed between a pair of adjacent, spaced platens adapted to form fluid cushions that force the films together. One of the platens is convergent. The corresponding fluid cushion also converges in the region where the films enter the space between the platens. The apex of the convergence is preferably aligned with the centers of the films. Thus, as the films are transported between the platens, the leading edge of the fluid cushions drives the air from between the films in much the way that a snowplow clears a street.

In one embodiment, the fluid cushion is formed by a trough having sides that converge. In another embodiment, the converging fluid cushion is formed by a converging slab of microporous material through which air is forced.

BRIEF DESCRIPTION OF THE DRAWING

The features of a specific embodiment of the best mode contemplated of carrying out the invention are illustrated in the drawing, in which:

FIG. 1 is a side elevation schematic view of a contact printing system that employs the principles of the invention;

FIG. 2 is a top plan view of a portion of the system of FIG. 1; and

FIGS. 3A and 3B are front elevation views in section of alternative embodiments of the system of FIGS. 1 and 2.

DETAILED DESCRIPTION OF THE DRAWING

In FIG. 1, a length of master film 10 bearing graphic information to be reproduced is guided from a supply reel 11 to a takeup reel 12 by spaced guide rollers 13 and 14. A length of raw film 15 on which the graphic information is to be reproduced is directed from a supply reel 16 to a takeup reel 17 by spaced guide rollers 18 and 19. Film 15 bears a photographic emulsion. Reels 11, 12, 16, and 17 are rotatably supported to permit the transfer of film from one reel to the other, and guide roller 19 is driven by a motor (not shown) to transport raw film 15. Alternatively, other more sophisticated film transporting and guiding equipment could be employed.

In the portion of the film path between guide rollers 13 and 18 and guide rollers 14 and 19, master film 10 and raw film 15 are adjacent to and in alignment with each other. Adjacent spaced platens 30 and 31 are disposed so films 10 and 15 pass between them in the adjacent portion of the film path. Platens 30 and 31 are adapted to produce cushions of air between their respective inner surfaces and the respective outer surfaces of films 10 and 15, thereby forcing films 10 and 15 into intimate contact with each other. Thus, as one of the films, i.e., film 15, is positively driven, the other film is driven along in intimate non-slipping contact with it. In FIG. 1, films 10 and 15 are shown spaced to distinguish them from each other and are depicted without thickness. An arrow 20 depicts the direction of transport of films 10 and 15 from their respective supply reels to their respective takeup reels. Platen 30 has a transparent section 32 behind which a light source 33 is located. Light from source 33 is coupled through transparent section 32 to the space between platens 30 and 31, thereby exposing films 10 and 15 to light, as they are transported between platens 30 and 31.

As illustrated in FIG. 2, platen 30 has an end portion 34 that converges toward the region where the films initially pass between platens 30 and 31. The converging sides of portion 34 form an apex 35 that is aligned with the center of films 10 and 15 and set back from the adjacent end of platen 31. This construction produces air cushions that conform to the shape of end portion 34. Consequently, as films 10 and 15 enter the space between platens 30 and 31, they are initially forced together only at their centers. As films 10 and 15 then progress further into the space between platens 30 and 31, they are gradually forced into contact in a continuous sweep across their surfaces in an outwardly direction toward their edges. After films 10 and 15 pass beyond end portion 34, the air cushions maintain them in intimate contact from edge to edge until they leave the space between platens 30 and 31. By gradually forcing films 10 and 15 into contact in a continuous sweep across their surfaces, end portion 34 functions much like a snowplow that is clearing snow from a street. By forcing films 10 and 15 into contact from their centers outwardly to their edges, the distance of travel of the air forced out from between films 10 and 15 is minimized.

FIG. 3A illustrates one configuration for platens 30 and 31. This embodiment of the invention is particularly suited for the apparatus disclosed in application Ser. No. 27,690. Platen 30 comprises a trough-shaped housing 40 that has side walls 41 and 42. Side walls 41 and 42 extend along the edges of film 10 to end portion 34 where side walls 41 and 42 begin to converge, finally meeting at apex 35. As explained in detail in the copending application, Ser. No. 27,690 air having a high static head is introduced into the space enclosed by the housing and leaks out between the side walls and the film to produce a sharp pressure drop at the side walls. Platen 31 comprises a rectangular slab 43 of microporous material which covers the open side of a plenum chamber 44. Air is introduced into plenum chamber 44 at a high pressure through a port 47. This air is forced through slab 43 and forms a low pressure cushion of air between the top surface of slab 43 and the bottom surface of film 15.

FIG. 3B illustrates another configuration of platens 30 and 31. Platen 31 in FIG. 3B is identical to platen 31 in FIG. 3A. Platen 30, however, comprises a slab 45 of microporous material that converges at end portion 34 to form apex 35 and an identically shaped plenum chamber 46 that overlies slab 45. Air at a high pressure is introduced into plenum chamber 46 through a port 48 and is forced through slab 45 to form a cushion of air between the lower surface of slab 45 and the upper surface of film 10.

For more details on the microporous material reference is made to the copending application of Minard A. Leavitt and Poul B. Roulund, entitled APPARATUS FOR HOLDING TWO FILMS IN INTIMATE CONTACT WITH EACH OTHER, Ser. No. 46,430. Basically a microporous material is used herein to refer to a material having tiny interconnected cells.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of the invention. For example, the two films could be gradually forced into contact in a continuous sweep from one edge to the other rather than from the center outwardly to the edges. The term "film" is used in this specification to include all flexible ribbon type media, e.g., photographic film, magnetic tape, paper tape, etc. The invention can be employed to transfer other types of information from one medium to another, e.g., magnetically recorded information from tape to tape. Instead of air, any other suitable fluid or force transmitting instrumentality could be employed to force the film into intimate contact in accordance with the invention. For example, the invention could be employed in a drum-type contact printer.

What is claimed is:

1. Apparatus for bringing an elongated master film bearing information and an elongated raw film into intimate contact with each other, the apparatus comprising:
   means for guiding the raw film in a first path;
   means for guiding the master film in a second path part of which is adjacent to part of the first path;
   means for transporting the films;
   first and second adjacent spaced platens disposed so the adjacent parts of the first and second paths lie in the space between the platens, the platens being adapted to produce air cushions between the platens and the films to force the films into contact, the first platen converging in a plane parallel to the films toward an apex at a point where the films initially meet to force the master film and the raw film gradually into contact as they move past the apex; and
   means for transferring the information from the master film to the raw film while the films are in contact between the platens.

2. The apparatus of claim 1, in which the information on the film is in graphic form, the raw film bears a photographic emulsion, and the transferring means comprises a transparent section in the platen facing the master film and a source of light disposed behind the transparent section, the source of light being directed through the transparent section onto the master film.

3. The apparatus of claim 1, in which the first platen comprises a trough closing the space on one side of the master film except for the film edges, the trough being shaped to form a space reduction near each edge of the master film, and means for directing a fluid having a high static head into the space between the trough and the master film, and trough being aligned with the length of the master film and having sides that converge at the end that initially meets the film during transport, thereby forming the apex of the first platen.

4. The apparatus of claim 1, in which the first platen comprises an elongated slab of microporous material and means for forcing fluid through the microporous material into the region between the first platen and the adjacent film, the slab being aligned with the length of the master film and having sides that converge at the end that initially meets the film during transport, thereby forming the apex of the first platen.

5. A contact film printing system comprising:
   a length of raw photographic film;
   a length of master photographic film bearing information to be transferred to the raw film;
   means for transporting the raw film and the master film so they are adjacent to and aligned with each other over a portion of their film paths;
   a first elongated platen made of microporous material disposed on one side of the films in the adjacent portion of the film paths;
   means for forcing air through the microporous material into the space between the microporous material and the films;
   a second elongated platen disposed on the other side of the films in the adjacent portion of the film paths, the second platen comprising a trough having sides that extend along the edges of the films for the greater part of the adjacent portion of the film paths and converge to an apex at the point where the films first pass between the platens during film transport;
   means for introducing a fluid having a high static head into the space between the trough and the films so a small quantity of the fluid flows laterally across the films, is constructed at the side walls, and escapes from the trough between the film and the side walls of the trough;
   a transparent section in the trough; and
   a source of light behind the trough and directed through the transparent section onto the films to expose the raw film to the information on the master film.

* * * * *